(12) United States Patent
Chung et al.

(10) Patent No.: US 9,672,105 B2
(45) Date of Patent: Jun. 6, 2017

(54) DEVICE AND METHOD FOR PROCESSING DATA USING LOGICAL INFORMATION AND PHYSICAL INFORMATION

(71) Applicant: SAMSUNG ELECTRONICS CO., LTD., Suwon-si, Gyeonggi-Do (KR)

(72) Inventors: Jung Soo Chung, Seoul (KR); Jun Jin Kong, Yongin-si (KR); Hongrak Son, Anyang-si (KR); Pilsang Yoon, Hwaseong-si (KR); Seong Hyeog Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 67 days.

(21) Appl. No.: 14/641,649

(22) Filed: Mar. 9, 2015

(65) Prior Publication Data

US 2015/0261606 A1 Sep. 17, 2015

(30) Foreign Application Priority Data

Mar. 13, 2014 (KR) .................. 10-2014-0029837

(51) Int. Cl.
| | | |
|---|---|---|
| *G11C 29/00* | (2006.01) | |
| *G06F 11/10* | (2006.01) | |
| *G06F 11/14* | (2006.01) | |
| *H04L 9/06* | (2006.01) | |
| *H04L 9/08* | (2006.01) | |
| *G11C 29/04* | (2006.01) | |

(52) U.S. Cl.
CPC ...... *G06F 11/1072* (2013.01); *G06F 11/1016* (2013.01); *G06F 11/1451* (2013.01); *H04L 9/0662* (2013.01); *H04L 9/0869* (2013.01); *H04L 9/0894* (2013.01); *G06F 2201/84* (2013.01); *G11C 2029/0411* (2013.01)

(58) Field of Classification Search
None
See application file for complete search history.

(56) References Cited

U.S. PATENT DOCUMENTS

| | | | | |
|---|---|---|---|---|
| 7,451,288 B2 * | 11/2008 | Goettfert | ............. | G06F 12/1408 |
| | | | | 711/164 |
| 8,127,200 B2 | 2/2012 | Sharon et al. | | |
| 8,154,918 B2 | 4/2012 | Sharon et al. | | |
| 8,301,912 B2 | 10/2012 | Lin et al. | | |
| 8,352,750 B2 * | 1/2013 | Haines | .................... | G06F 21/80 |
| | | | | 713/193 |
| 8,370,561 B2 | 2/2013 | Sharon et al. | | |
| 8,526,605 B2 * | 9/2013 | Matthews, Jr. | ..... | G06F 12/1408 |
| | | | | 380/277 |
| 2008/0065905 A1 * | 3/2008 | Salessi | .................... | G06F 21/31 |
| | | | | 713/193 |

(Continued)

FOREIGN PATENT DOCUMENTS

KR 100659182 B1 12/2008

*Primary Examiner* — Daniel McMahon
(74) *Attorney, Agent, or Firm* — Volentine & Whitt, PLLC

(57) ABSTRACT

A method of operating a data storage device includes generating at least one pseudo noise (PN) sequence using logical information and physical information for the data storage device. The method also includes converting first data into second data using the at least one PN sequence. The logical information may be a logical address for the data storage device, and the physical information may be a physical address for the data storage device.

14 Claims, 11 Drawing Sheets

(56) References Cited

U.S. PATENT DOCUMENTS

| | | | |
|---|---|---|---|
| 2009/0204824 A1* | 8/2009 | Lin | G06F 12/0246 |
| | | | 713/193 |
| 2009/0300372 A1* | 12/2009 | Lee | G06F 21/79 |
| | | | 713/193 |
| 2010/0293393 A1 | 11/2010 | Park | |
| 2010/0332735 A1* | 12/2010 | Jung | G06F 12/0246 |
| | | | 711/103 |
| 2012/0005416 A1 | 1/2012 | Lee et al. | |
| 2012/0185654 A1 | 7/2012 | Kim et al. | |
| 2012/0215963 A1 | 8/2012 | Kim et al. | |
| 2012/0221775 A1 | 8/2012 | Kim et al. | |
| 2012/0278635 A1 | 11/2012 | Hars et al. | |
| 2012/0287719 A1 | 11/2012 | Mun et al. | |
| 2013/0121090 A1 | 5/2013 | Park et al. | |
| 2013/0124783 A1 | 5/2013 | Yoon et al. | |
| 2013/0326030 A1* | 12/2013 | Schmidt | H04L 61/103 |
| | | | 709/220 |
| 2013/0326158 A1* | 12/2013 | Chen | G06F 12/0607 |
| | | | 711/148 |

* cited by examiner

DEVICE AND METHOD FOR PROCESSING DATA USING LOGICAL INFORMATION AND PHYSICAL INFORMATION

CROSS-REFERENCE TO RELATED APPLICATIONS

This application claims priority under 35 U.S.C. §119(a) from Korean Patent Application No. 10-2014-0029837 filed on Mar. 13, 2014, the disclosure of which is hereby incorporated by reference in its entirety.

BACKGROUND

Embodiments of the present inventive concept relate to a data storage device, and more particularly to a device which is capable of generating a pseudo noise (PN) sequence using logical information and physical information, and processing data using the PN sequence.

Pseudo random numbers are used in some communication systems and data storage systems. The pseudo random numbers are used to generate a pseudo random number sequence.

A linear feedback shift register (LFSR) is used to generate the pseudo random number sequence or the pseudo noise sequence. The LFSR changes the pseudo random number sequence by changing an initial value referred to as a seed or seed value, or by changing feedback taps.

A randomizer converts data into randomized data using the pseudo random number sequence generated by the LFSR. A de-randomizer also converts the randomized data into de-randomized data using the pseudo random number sequence generated by the LFSR. The randomness of the pseudo random number sequence has to be ensured.

In order to develop a cheap flash memory with high density, studies for scaling down size and for providing a multi-level cell (MLC) have been actively progressing.

Since coupling or disturbances between adjacent multi-level cells becomes more pronounced as the scaling down proceeds or the multi-level cell stores more bits, the threshold voltage distribution is deteriorated.

A copy back operation denotes an operation of copying data of a specific page to another page in a flash memory cell array.

According to whether the copy back operation on data of a specific page in a flash memory cell array is performed inside or outside the flash memory cell array, the copy back operation may be classified into internal copy back or external copy back. Performance of a copy back operation using internal copy back is generally better than performance of a copy back operation using external copy back.

In case of an internal copy back operation, data randomness of a buffer block (e.g., single level cell (SLC)) is easy to ensure. However, since it is hard to estimate into which multi-level cell block data of the buffer block is merged, data randomness of a multi-level cell block is difficult to ensure.

SUMMARY

A technical object of the present inventive concepts is to provide a randomizer which may ensure both randomness of a SLC block and randomness of an MLC block.

Another technical object of the present inventive concepts is to provide a data storage device including the randomizer.

An embodiment of the present inventive concepts is directed to an operation method of a data storage device, including generating at least one pseudo noise (PN) sequence using logical information and physical information for the data storage device, and converting first data into second data using the at least one PN sequence.

According to an exemplary embodiment, generating the at least one PN sequence includes generating a pseudorandom seed based on the logical information and the physical information, and generating the at least one PN sequence using the pseudorandom seed. The logical information may be a logical page address for the data storage device, and the physical information may be a physical page address for the memory storage device.

According to another exemplary embodiment, generating the at least one PN sequence may include adding the logical page address and the physical page address, and generating the pseudorandom seed according to a result of the addition.

According to still another exemplary embodiment, generating the at least one PN sequence may include performing an XOR operation on the logical page address and the physical page address, and generating the pseudorandom seed according to a result of the XOR operation.

According to an exemplary embodiment, converting the first data into the second data includes randomizing the first data so as to obtain randomized second data.

According to another exemplary embodiment, converting the first data into the second data includes de-randomizing the first data so as to obtain de-randomized second data.

According to still another exemplary embodiment, generating the at least one PN sequence includes generating a first PN sequence using one of the logical information and the physical information, and generating a second PN sequence using the other of the logical information and the physical information, and converting the first data into the second data includes a first step of converting the first data into intermediate data using the first PN sequence, and a second step of converting the intermediate data into the second data using the second PN sequence.

In some embodiments, the first step randomizes the first data to obtain the randomized intermediate data, and the second step randomizes the intermediate data to obtain the randomized second data.

In some embodiments, the first step de-randomizes the first data to obtain the de-randomized intermediate data, and the second step de-randomizes the intermediate data to obtain the de-randomized second data.

An exemplary embodiment of the present inventive concepts is directed to a data storage device, including a memory, a PN sequence creator which generates at least one PN sequence using logical information and physical information for the memory, a randomizer which randomizes first data using the at least one PN sequence to obtain randomized second data to be stored in the memory, and a de-randomizer which de-randomizes third data output from the memory using the at least one PN sequence to obtain de-randomized fourth data.

BRIEF DESCRIPTION OF THE DRAWINGS

These and/or other aspects and advantages of the present general inventive concept will become apparent and more readily appreciated from the following description of the embodiments, taken in conjunction with the accompanying drawings.

DETAILED DESCRIPTION OF THE EMBODIMENTS

Figure 1:
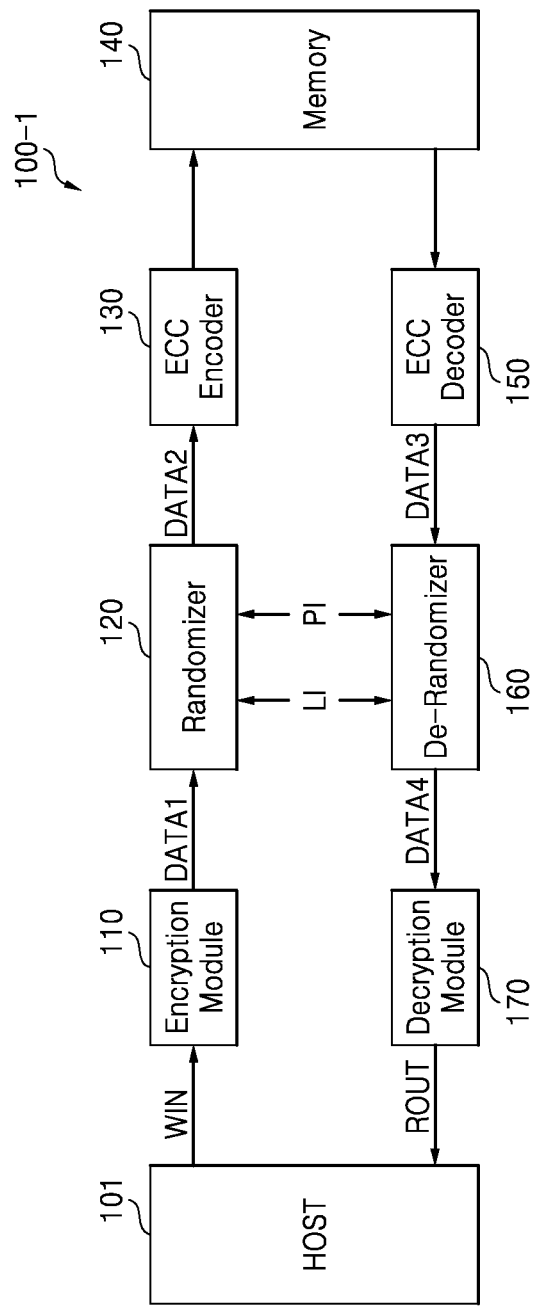
FIG. 1 is a block diagram of a data processing system including a randomizer and a de-randomizer according to an example embodiment of the present inventive concepts.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of a data processing system 100-1 which includes a randomizer and a de-randomizer according to an exemplary embodiment of the present inventive concepts.

Referring to FIG. 1, data processing system 100-1 includes a host 101, a randomizer 120, an ECC encoder 130, a memory 140, an ECC decoder 150, and a de-randomizer 160. According to an exemplary embodiment, the data processing system 100-1 may further include an encryption module 110 and a decryption module 170.

According to one or more exemplary embodiments, a data storage device may include randomizer 120, ECC encoder 130, memory 140, ECC decoder 150, and de-randomizer 160. According to one or more exemplary embodiments, the data storage device may further include encoding module 110 and decoding module 170.

Data processing system 100-1 may be embodied in a personal computer (PC), a data server, and a portable electronic device.

The portable electronic device may be embodied in a laptop computer, a mobile phone, a smart phone, a tablet PC, a digital camera, a camcorder, a mobile internet device (MID), or a wearable computer.

Host 101 may control an operation of data processing system 100-1. According to an exemplary embodiment, host 101 may be embodied in a memory controller which may control an operation of the data storage device. According to another exemplary embodiment, host 101 may be embodied in an integrated circuit, a system on chip (SoC), an application processor or a mobile AP.

Randomizer 120 may generate a pseudo noise (PN) sequence using logical information LI and physical information PI, randomize a first data DATA1 using the generated PN sequence, and generate a randomized second data DATA2. For example, the first data DATA1 may be data output from host 101.

For example, the logical information LI may be a logical page address in memory 140, and the physical information PI may be a physical page address in memory 140, identifying one or more locations in memory 140 where data is to be written and stored.

ECC encoder 130 may perform error correction code (ECC) encoding the randomized second data DATA2, and store the ECC encoded data in memory 140 at one or more locations corresponding to the logical page address and physical page address.

Memory 140 may be a flash-based memory. For example, memory 140 may be embodied in a NAND flash memory or a NOR flash memory.

A data storage device including memory 140 may be a solid state drive (SSD), an embedded SSD (eSSD), a multimedia card (MMC), an embedded MMC (eMMC), a universal flash storage (UFS), a smart card, or a memory card.

Memory 140 may be embodied in not only a flash-based memory but also a non-volatile memory.

ECC decoder 150 may perform an ECC decoding operation on randomized data output from memory 140, and output the ECC decoded data DATA3 to de-randomizer 160.

According to exemplary embodiments, ECC encoder 130 may be embodied between host 101 and randomizer 120, between encryption module 110 and randomizer 120, or between randomizer 120 and memory 140. In addition, ECC decoder 150 may be embodied between memory 140 and de-randomizer 160, between de-randomizer 160 and host 101, or between de-randomizer 160 and decryption module 170.

The de-randomizer 160 may generate a PN sequence using logical information LI and physical information PI, de-randomize third data DATA3 using the generated PN sequence, and output de-randomized fourth data DATA4 to host 101.

For example, except for input data and output data, randomizer 120 and de-randomizer 160 may be substantially the same in structure.

As described above, when data processing system 100-1 further includes encryption module 110 and decryption module 170, data WIN output from host 101 may be encrypted by encryption module 110, and the encrypted first data DATA1 may be transmitted to randomizer 120. Moreover, the de-randomized fourth data DATA4 output from de-randomizer 160 may be decrypted by decryption module 170, and the decrypted data ROUT may be transmitted to host 101.

Figure 2:
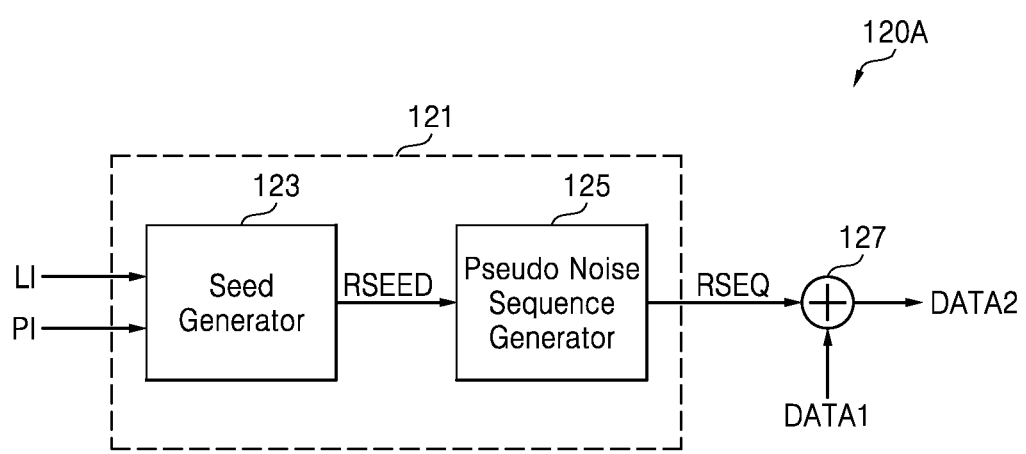
FIG. 2 is a block diagram which shows an exemplary embodiment of the randomizer illustrated in FIG. 1.

FIG. 2 is a block diagram which shows an exemplary embodiment of randomizer 120 illustrated in FIG. 1.

Referring to FIGS. 1 and 2, a randomizer 120A according to an exemplary embodiment of randomizer 120 includes a PN sequence creator (e.g., a PN sequence generation circuit) 121 and a converter (e.g., a conversion circuit) 127.

The PN sequence creator 121 may generate a PN sequence RSEQ using logical information LI and physical information PI. The logical information LI may be a logical page address in memory 140, and the physical information PI may be a physical page address in memory 140, identifying one or more locations in memory 140 where data which is to be randomized by randomizer 120A (e.g., DATA1 after further processing) is to be written and stored.

The PN sequence creator 121 includes a seed generator 123 and a PN sequence generator 125.

The seed generator 123 may generate a pseudorandom seed RSEED using the logical information LI and the physical information PI. For example, seed generator 123 may be embodied in an adder or an XOR gate.

PN sequence generator 125 may generate a randomized sequence RSEQ, that is, a PN sequence RSEQ, using the pseudorandom seed RSEED. For example, the PN sequence RSEQ may be a binary sequence or a non-binary sequence.

PN sequence generator 125 may be embodied, for example, in a Fibonacci linear feedback PN sequence generator, a Galois linear feedback PN sequence generator, a Fibonacci non-linear feedback PN sequence generator, or a Galois non-linear feedback PN sequence generator.

Converter 127 may randomize first data DATA1 using the PN sequence RSEQ, and generate randomized second data DATA2.

For example, converter 127 may perform modulo addition on the PN sequence RSEQ and the first data DATA1, thereby generating randomized second data DATA2 as a result.

According to exemplary embodiments, converter 127 may be embodied in a Boolean logic gate, e.g., an AND gate, a NAND gate, an OR gate, a NOR gate, an exclusive-or (XOR) gate, an exclusive-nor (XNOR) gate, or a combination of these.

Figure 3:
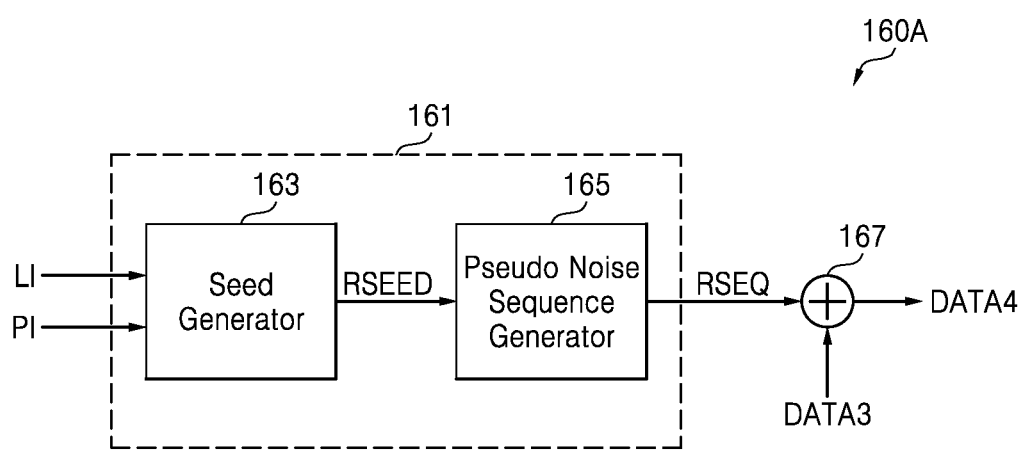
FIG. 3 is a block diagram which shows an exemplary embodiment of the de-randomizer illustrated in FIG. 1.

FIG. 3 is a block diagram which shows an exemplary embodiment of de-randomizer 160 illustrated in FIG. 1. Referring to FIGS. 1 to 3, except for input data DATA3 and output data DATA4 of de-randomizer 160A, randomizer 120A of FIG. 2 and a de-randomizer 160A of FIG. 3 may be substantially the same as each other in structure and operation.

De-randomizer 160A according to an exemplary embodiment of de-randomizer 160 includes a PN sequence creator (e.g., a PN sequence generator circuit) 161 and a converter (e.g., a conversion circuit) 167.

PN sequence creator 161 may generate the PN sequence RSEQ using logical information LI and physical information PI. The logical information LI may be a logical page address in memory 140, and the physical information PI may be a physical page address in memory 140, identifying one or more locations in memory 140 where data (e.g., DATA3) which is to be de-randomized by de-randomizer 160A is or was stored.

PN sequence creator 161 includes a seed generator 163 and a PN sequence generator 165.

Converter 167 may de-randomize third data DATA3 using the PN sequence RSEQ, and generate de-randomized fourth data DATA4.

For example, converter 167 may perform modulo subtraction on the PN sequence RSEQ from the third data DATA3, thereby generating de-randomized fourth data DATA4 as a result.

When the PN sequence RSEQ is a binary sequence and each converter 127 and 167 is embodied in an XOR gate, a moduli-2 addition operation and a moduli-2 subtraction operation may have the same result.

Seed generators 123 and 163 may have substantially the same structure and operation as each other, and PN sequence generators 125 and 165 may have substantially the same structure and operation as each other. As described above, each of converters 127 and 167 may be embodied in an XOR gate.

Figure 4:
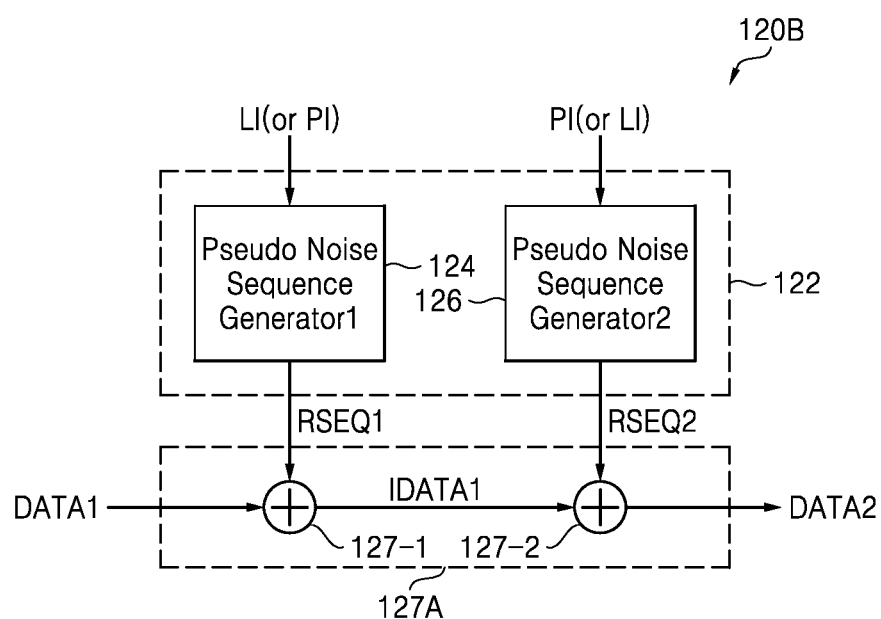
FIG. 4 is a block diagram which shows another exemplary embodiment of the randomizer illustrated in FIG. 1.

FIG. 4 is a block diagram which shows another exemplary embodiment of randomizer 160 illustrated in FIG. 1. Referring to FIGS. 1 and 4, a randomizer 120B according to another exemplary embodiment of randomizer 120 includes a PN sequence creator (e.g., a PN sequence generation circuit) 122 and a conversion block 127A.

PN sequence 122 may generate PN sequences RSEQ1 and RSEQ2 by using logical information LI and physical information PI, and conversion block 127A may randomize first data DATA1 by using the PN sequences RSEQ1 and RSEQ2, and generate randomized second data DATA2.

PN sequence creator 122 may include a first PN sequence generator 124 and a second PN sequence generator 126.

First PN sequence generator 124 may generate a first PN sequence RSEQ1 by using one of logical information LI and physical information PI (for example, logical information LI). The logical information LI may be a logical page address in memory 140, and the physical information PI may be a physical page address in memory 140, identifying one or more memory locations in memory 140 where data which is to be randomized by randomizer 120B (e.g., DATA1 after further processing) is to be written and stored.

Conversion block 127A may include a first converter 127-1 and a second converter 127-2. First converter 127-1 may randomize the first data DATA1 by using the first PN sequence RSEQ1 and generate randomized intermediate data IDATA1.

Second PN sequence generator 126 may generate a second PN sequence RSEQ2 by using the other of the logical information LI and the physical information PI (for example, the physical information PI).

Second converter 127-2 may randomize again the intermediate data IDATA1 by using the second PN sequence RSEQ2, and generate randomized second data DATA2.

Each of PN sequence generators 124 and 126 may be embodied, for example, in a Fibonacci linear feedback PN sequence generator, a Galois linear feedback PN sequence generator, a Fibonacci non-linear feedback PN sequence generator, or a Galois non-linear feedback PN sequence generator.

According to exemplary embodiments, feedback polynomials of each of PN sequence generators 124 and 126 may be embodied to be the same as, or different from, each other.

For example, each of the PN sequences RSEQ1 and RSEQ2 may be a binary sequence or a non-binary sequence.

For example, each of converters 127-1 and 127-2 may be embodied in a Boolean logic gate, e.g., an AND gate, a NAND gate, an OR gate, a NOR gate, an XOR gate, an XNOR gate, or the combination of these.

According to another exemplary embodiment, conversion block 127A may perform an operation on the first PN sequence RSEQ1 and the second PN sequence RSEQ2, randomize first data DATA1 by using a result of the operation, and generate randomized second data DATA2. The type of operation may be, for example, an AND operation, a NAND operation, an OR operation, a NOR operation, an XOR operation, an XNOR operation, or a combination of these.

Figure 5:
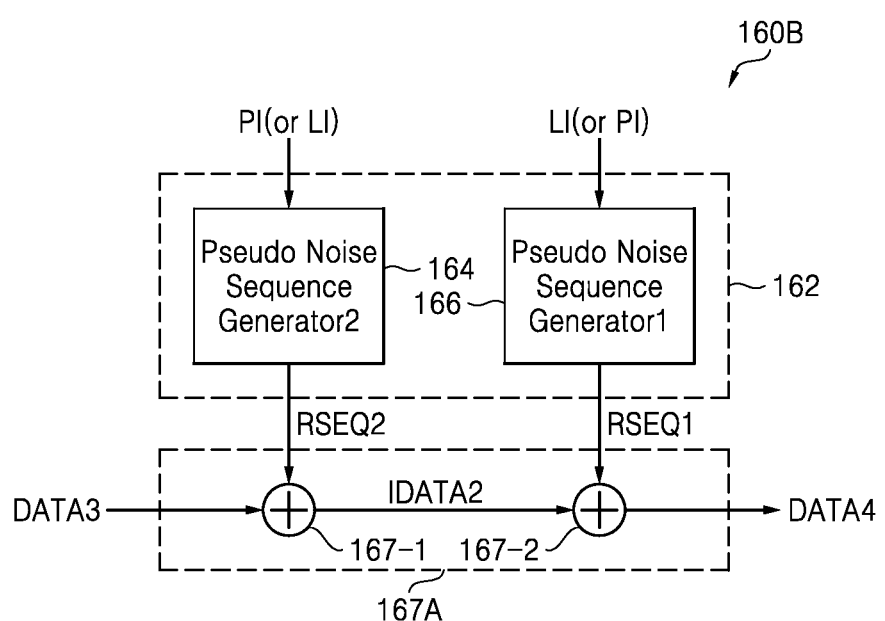
FIG. 5 is a block diagram which shows another exemplary embodiment of the de-randomizer illustrated in FIG. 1.

FIG. 5 is a block diagram which shows another exemplary embodiment of de-randomizer 160 illustrated in FIG. 1. Referring to FIGS. 1 and 5, a de-randomizer 160B according to another exemplary embodiment of de-randomizer 160 includes a PN sequence creator (e.g., a PN sequence generation circuit) 162 and a conversion block (e.g., a conversion circuit) 167A.

PN sequence creator 162 may generate the PN sequences RSEQ1 and RSEQ2 by using logical information LI and physical information PI, and conversion block 167A may de-randomize third data DATA3 by using the PN sequences RSEQ1 and RSEQ2 and generate de-randomized fourth data DATA4. The logical information LI may be a logical page address in memory 140, and the physical information PI may be a physical page address in memory 140, identifying one or more locations in memory 140 where data (e.g., DATA3) which is to be de-randomized by de-randomizer 160B is or was stored.

PN sequence creator 162 may include a second PN sequence generator 164 and a first PN sequence generator 166.

Second PN sequence generator 164 may generate the second PN sequence RSEQ2 by using one of logical information LI and physical information PI (for example, physical information PI).

Conversion block 167A may include a first converter 167-1 and a second converter 167-2. First converter 167-1 may de-randomize third data DATA3 and generate de-randomized intermediate data IDATA2 by using the second PN sequence RSEQ2.

First PN sequence generator 166 may generate the first PN sequence RSEQ1 by using the other of the logical information LI and the physical information PI (for example, the logical information LI).

Second converter 167-2 may de-randomize the intermediate data IDATA2 and generate de-randomized fourth data DATA4 by using the first PN sequence RSEQ1.

Each of PN sequence generators 164 and 166 may be embodied, for example, in a Fibonacci linear feedback PN sequence generator, a Galois linear feedback PN sequence generator, a Fibonacci non-linear feedback PN sequence generator, or a Galois non-linear feedback PN sequence generator.

According to exemplary embodiments, feedback polynomials of each of PN sequence generators 164 and 166 may be embodied to be the same as, or different from, each other.

For example, each of the PN sequences RSEQ1 and RSEQ2 may be a binary sequence or a non-binary sequence.

For example, each of the first and second converters 167-1 and 167-2 may be embodied in a Boolean logic gate, e.g., an AND gate, a NAND gate, an OR gate, a NOR gate, an XOR gate, and XNOR gate, or the combination of these.

According to another exemplary embodiment, conversion block 167A may perform an operation on the first PN sequence RSEQ1 and the second PN sequence RSEQ2, de-randomize third data DATA3 by using a result of the operation, and generate de-randomized fourth data DATA4. The type of operation may be, for example, a AND operation, a NAND operation, an OR operation, an XOR operation, an XNOR operation, or a combination of these.

Referring to FIGS. 4 and 5, when first PN sequence generator 124 of randomizer 120B generates the first PN sequence RSEQ1 by using logical information LI, and second PN sequence generator 126 generates the second PN sequence RSEQ2 by using physical information PI, second PN sequence generator 164 of de-randomizer 160B generates the second PN sequence RSEQ2 by using the physical information PI, and first PN sequence generator 166 generates the first PN sequence RSEQ1 by using the logical information LI.

According to another exemplary embodiment, when first PN sequence generator 124 of randomizer 120B generates the first PN sequence RSEQ1 by using physical information PI and second PN sequence generator 126 generates the second PN sequence RSEQ2 by using logical information LI, second PN sequence generator 164 of de-randomizer 160B generates the second PN sequence RSEQ2 by using the logical information LI, and first PN sequence generator 166 generates the first PN sequence RSEQ1 by using the physical information PI.

In other words, an input and an output of first PN sequence generator 124 of randomizer 120B should be the same as an input and an output of first PN sequence generator 166 of de-randomizer 160B, and an input and an output of second PN sequence generator 126 of randomizer 120B should be the same as an input and an output of second PN sequence generator 164 of de-randomizer 160B.

Figure 6:
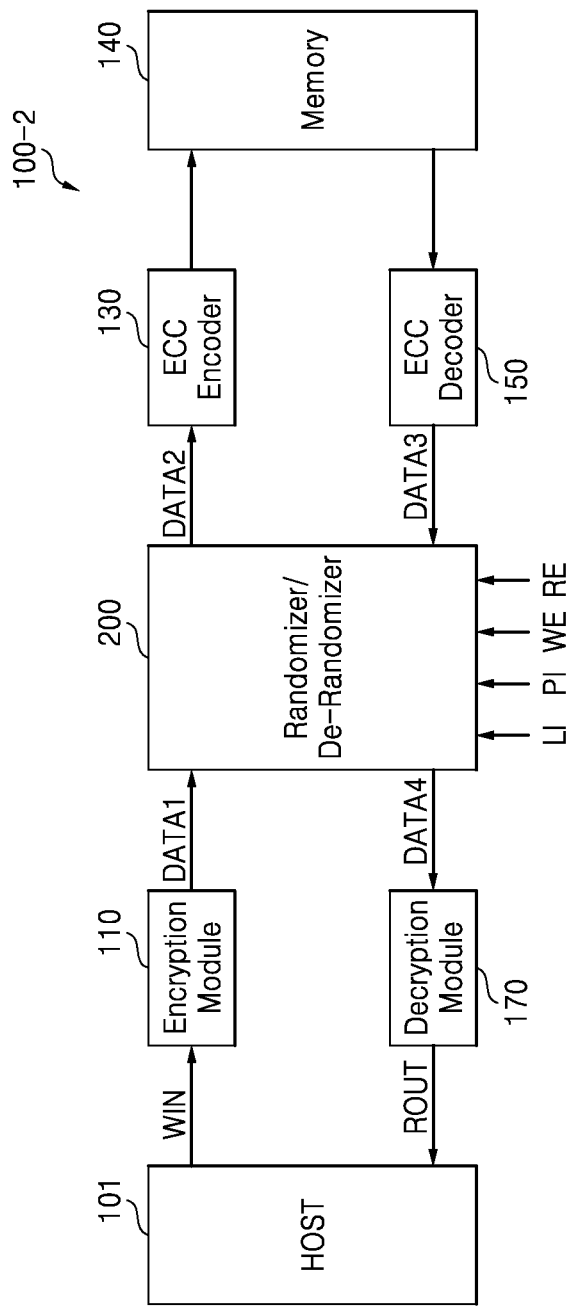
FIG. 6 is a block diagram of a data processing system including a randomizer and a de-randomizer according to another exemplary embodiment of the present inventive concepts.

FIG. 6 is a block diagram of a data processing system including a randomizer and a de-randomizer 200 according to another exemplary embodiment of the present inventive concepts.

Except for randomizer and de-randomizer 200, data processing system 100-1 of FIG. 1 is substantially the same as a data processing system 100-2 of FIG. 6 in structure and operation.

According to one or more exemplary embodiments, a data storage device may include randomizer/de-randomizer 200, ECC encoder 130, memory 140, and ECC decoder 150. According to one or more exemplary embodiments, the data storage device may further include encryption module 110 and decryption module 170.

Figure 7:
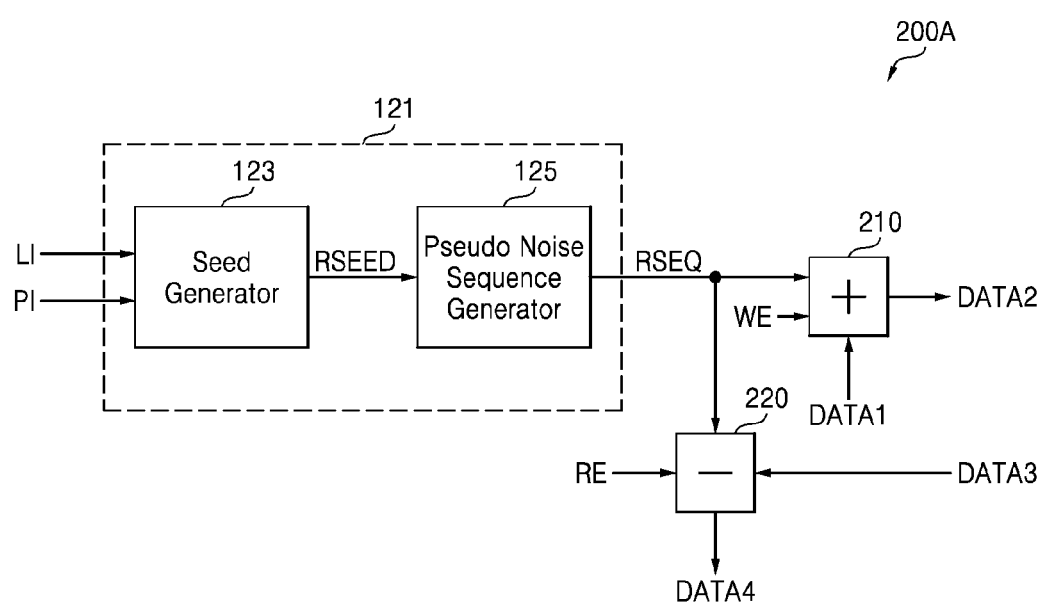
FIG. 7 is a block diagram which shows an exemplary embodiment of the randomizer/de-randomizer illustrated in FIG. 6.

FIG. 7 is a block diagram which shows an exemplary embodiment 200A of randomizer/de-randomizer 200 illustrated in FIG. 6.

Referring to FIGS. 6 and 7, a randomizer/de-randomizer 200A may include PN sequence creator 121, a first conversion block 210, and a second conversion block 220. As illustrated in FIG. 7, first conversion block 210 and second conversion block 220 may share one PN sequence creator 121.

During a write operation, a write enable signal WE is activated and a read enable signal RE is inactivated. Thus, during a write operation, first conversion block 210 may randomize first data DATA1 by using a PN sequence RSEQ and generate randomized second data DATA2 in response to the activated write enable signal WE.

During a read operation, the write enable signal WE is inactivated, and the read enable signal RE is activated. Thus, during a read operation, second conversion block 220 may de-randomize third data DATA3 by using a PN sequence RSEQ and generate de-randomized fourth data DATA4 in response to the activated read enable signal RE.

Figure 8:
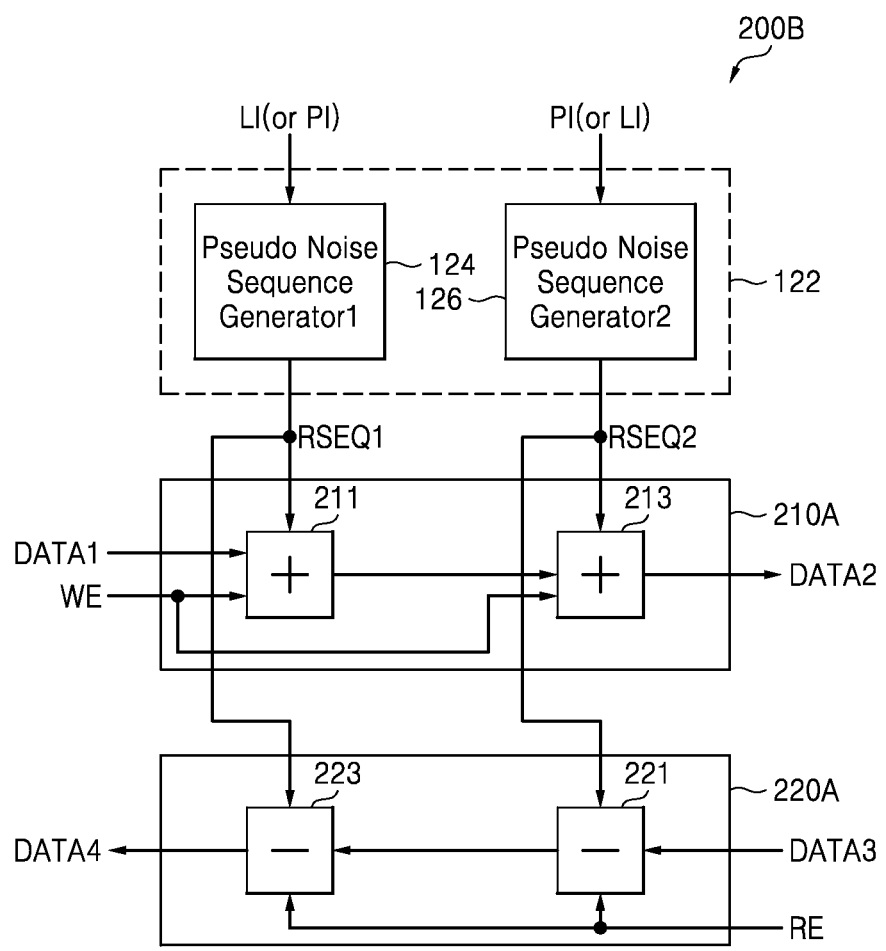
FIG. 8 is a block diagram which shows another exemplary embodiment of the randomizer/de-randomizer illustrated in FIG. 6.

FIG. 8 is a block diagram which shows another exemplary embodiment 200B of randomizer/de-randomizer 200 illustrated in FIG. 6. Referring to FIGS. 6 and 8, randomizer/de-randomizer 200B includes PN sequence creator 122, a first conversion block 210A, and a second conversion block 220A.

PN sequence creator 122 of FIG. 8 is substantially the same as PN sequence creator 122 of FIG. 4 in structure and operation. First conversion block 210A includes a first converter 211 and a second converter 213. Second conversion block 220A includes a third converter 221 and a fourth converter 223.

During a write operation, the write enable signal WE is activated, and the read enable signal RE is inactivated. Thus, during a write operation, first converter 211 may randomize first data DATA1 by using the first PN sequence RSEQ1 and generate randomized intermediate data in response to the activated write enable signal WE.

During the write operation, second converter 213 may randomize the intermediate data by using the second PN sequence RSEQ2 and generate randomized second data DATA2 in response to the activated write enable signal WE.

During a read operation, the write enable signal WE is inactivated, and the read enable signal RE is activated. Thus, during a read operation, third converter 221 may de-randomize third data DATA3 by using the second PN sequence RSEQ2 and generate de-randomized intermediate data in response to the activated read enable signal RE.

During the read operation, fourth converter 223 may de-randomize the intermediate data by using the first PN sequence RSEQ1 and generate de-randomized fourth data DATA4 in response to the activated read enable signal RE.

Each of converters 211 and 213 of first conversion block 210A may be embodied in a Boolean logic gate, as described above. Each of third and fourth converters 221 and 223 of second conversion block 220A may be embodied in a Boolean logic gate described above. For example, "+" illustrated in FIG. 8 may mean modulo addition, and "−" may mean modulo subtraction.

Figure 9:
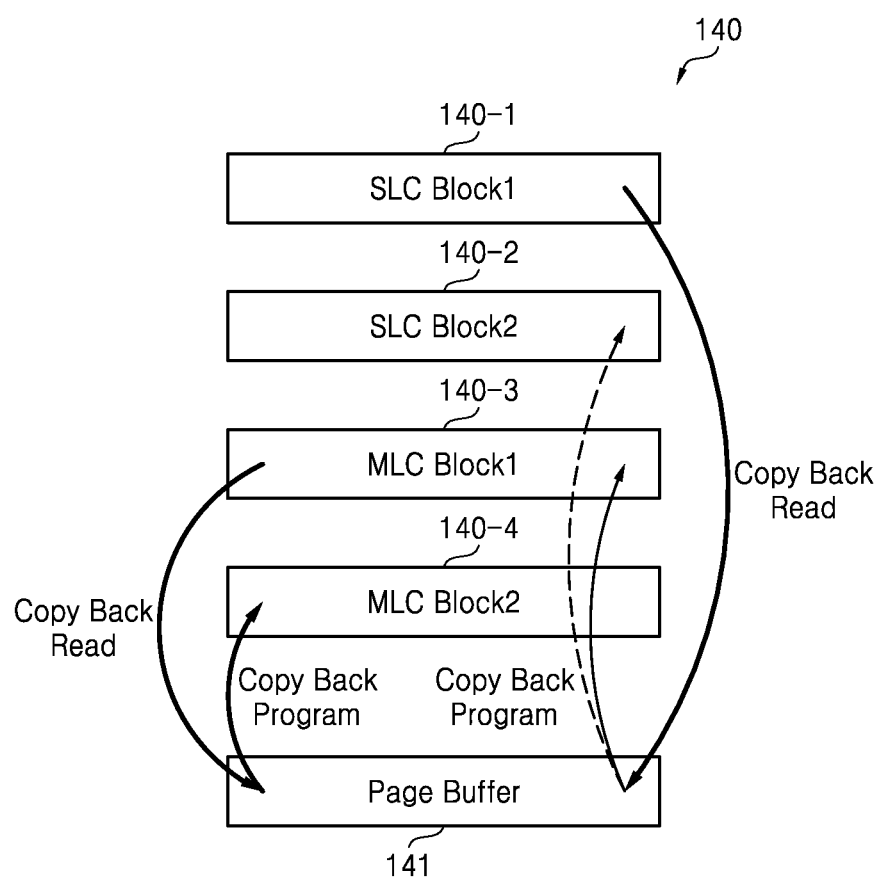
FIG. 9 is a conceptual diagram for describing an internal copy back operation of a memory illustrated in FIGS. 1 and 6.

FIG. 9 is a conceptual diagram for describing an internal copy back operation of a memory illustrated in FIGS. 1 and 6.

For example, the internal copy back operation may mean a copy back operation performed inside memory 140, an external copy back operation may mean a copy back operation which reads data stored in memory 140 outside memory 140 and is performed by using read data.

When memory 140 is embodied in a NAND flash-based memory, it is assumed that memory 140 includes a plurality of single level cell (SLC) blocks 140-1 and 140-2, a plurality of multi level cell (MLC) blocks 140-3 and 140-4, and a page buffer 141.

Each of SLC blocks 140-1 and 140-2 includes a plurality of SLC cells, and each of MLC blocks 140-3 and 140-4 includes a plurality of MLC cells. Here, an MLC cell refers to a cell which may store two-bits or more.

According to an exemplary embodiment, data (that is, randomized second data) stored in first SLC block 140-1 is transmitted to page buffer 141 through a copy back read operation for the internal copy back operation. Then, the data transmitted to page buffer 141 may be programmed in, or written into, second SLC block 140-2 or first MLC block 140-3 through a copy back programming operation.

According to another exemplary embodiment, data (that is, randomized second data) stored in first MLC block 140-3 is transmitted to page buffer 141 through a copy back read operation for the internal copy back operation. Then, the data transmitted to page buffer 141 may be programmed in, or written into, second MLC block 140-4 through the copy back programming operation.

A method of programming data in an MLC block using an SLC block may be referred to as on-chip buffered programming.

Figure 10:
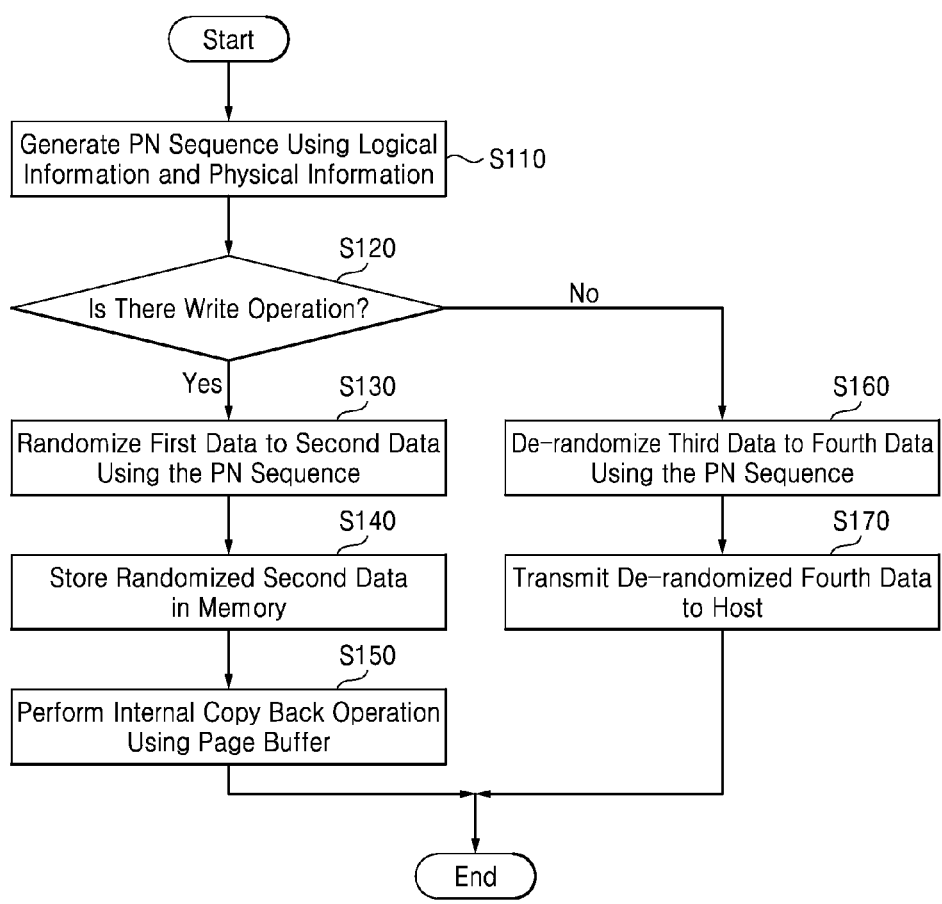
FIG. 10 is a flowchart for describing an exemplary embodiment of an operation of the data processing system illustrated in FIGS. 1 and 6.

FIG. 10 is a flowchart for describing an exemplary embodiment of an operation of the data processing system illustrated in FIGS. 1 and 6.

Referring to FIGS. 1, 2, 3, 6, 7, 9, and 10, PN sequence creator 121 or 161 generates a PN sequence RSEQ using logical information LI and physical information PI (S110) identifying one or more locations in a memory device for data which is to be processed by the data processing system.

When a write operation is performed (YES in S120), converter 127 or first conversion block 210 randomizes first data DATA1 using the PN sequence RSEQ (S130). According to an exemplary embodiment, randomized second data DATA2 is stored in first SLC block 140-1 of memory 140 (S140). The second data DATA2 stored in first SLC block 140-1 then may be stored in a second SLC block 140-2 or a first MLC block 140-3 through the internal copy back operation (S150).

According to another exemplary embodiment, randomized second data DATA2 is stored in first MLC block 140-3 of memory 140 (S140). The second data DATA2 stored in first MLC block 140-3 then may be stored in a second MLC block 140-4 through the internal copy back operation (S150).

However, when a read operation is performed (NO in S120), converter 167 or second conversion block 220 de-randomizes third data DATA3 using the PN sequence RSEQ (S160). De-randomized fourth data DATA4 is transmitted to host 101 (S170).

Figure 11:
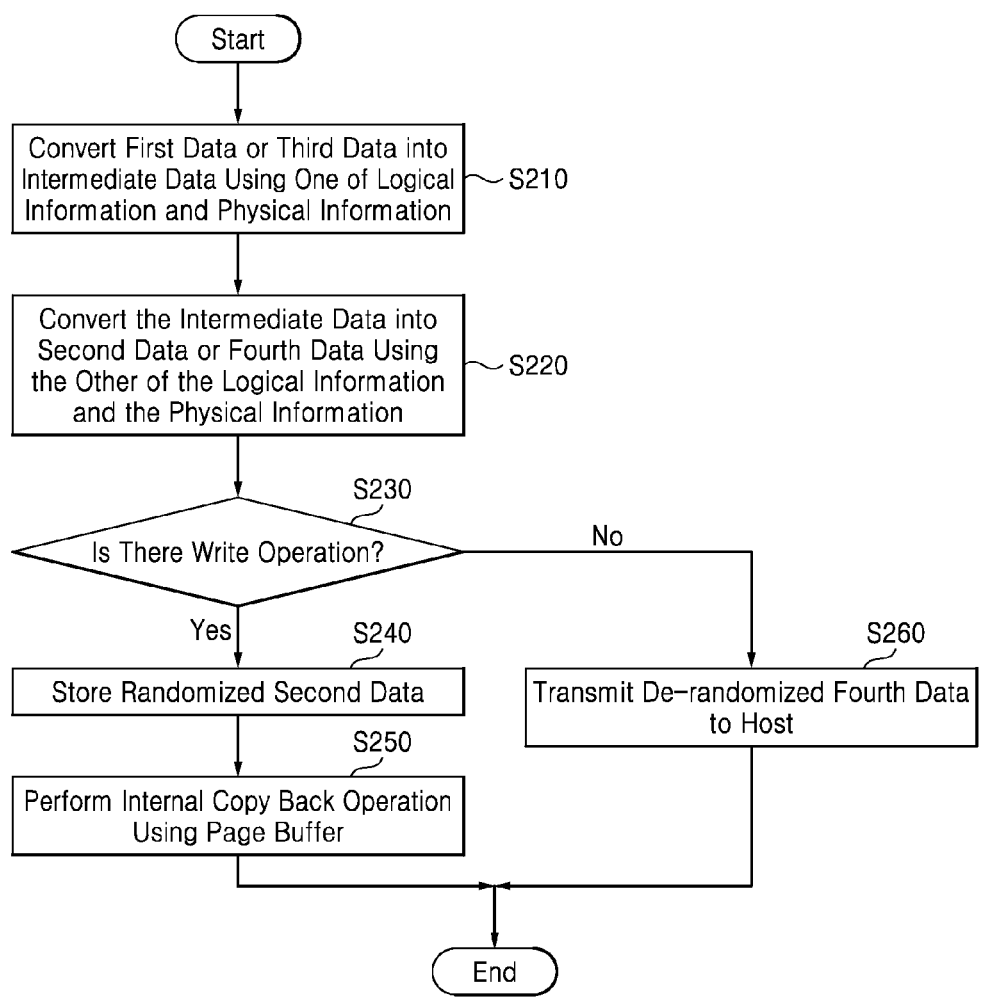
FIG. 11 is a flowchart for describing another exemplary embodiment of the operation of the data processing system illustrated in FIGS. 1 and 6.

FIG. 11 is a flowchart for describing another exemplary embodiment of operations of the data processing system illustrated in FIGS. 1 and 6.

Referring to FIGS. 1, 4, 5, 6, 8, 9, and 11, for randomizing, converter 127-1 or 211 converts first data DATA1 into intermediate data using a first PN sequence RSEQ1 generated based on one of the logical information LI and the physical information PI (S210). Here, logical information LI may be a logical page address in memory, and the physical information PI may be a physical page address in memory, corresponding to the data which is to be processed.

For de-randomizing, converter 167-1 or 221 converts the third data DATA3 into the intermediate data using the second PN sequence RSEQ2 generated based on the other of the logical information LI and the physical information PI (S210).

For randomizing, converter 127-2 or 213 converts the intermediate data into second data DATA2 using the second PN sequence RSEQ2 generated based on the other of the logical information LI and the physical information PI (S220).

For de-randomizing, converter 167-2 or 223 converts the intermediate data into the fourth data DATA4 using the first PN sequence RSEQ1 generated based on the one of the logical information LI and the physical information PI (S220).

When a write operation is performed (YES in S230), the randomized second data DATA2 is stored in first SLC block 140-1 of memory 140 (S240). The second data DATA2 stored in first SLC block 140-1 then may be stored in second SLC block 140-2 or first MLC block 140-3 through the internal copy back operation (S250).

According to another exemplary embodiment, the randomized second data DATA2 is stored in first MLC block 140-3 of memory 140 (S240). The second data DATA2 stored in first MLC block 140-3 then may be stored in second MLC block 140-4 through the internal copy back operation (S250).

However, when a read operation is performed (NO in S230), the de-randomized fourth data DATA4 is transmitted to host 101 (S260).

Since a pseudorandom seed RSEED is generated according to a combination of the logical information LI and the physical information PI for the data which is being processed, one pseudorandom seed per word line is generated. Accordingly, randomness of an SLC block and randomness of an MLC block are ensured.

A method according to an exemplary embodiment of the present inventive concepts and a device capable of performing the method may generate a PN sequence using logical information related to a logical address and physical information related to a physical address, and randomize or de-randomize data using the generated PN sequence.

The method according to an exemplary embodiment of the present inventive concepts and a device capable of performing the method may support an internal copy back operation from a SLC block to an MLC block or a SLC block to a SLC block.

In addition, the method according to an exemplary embodiment of the present inventive concepts and a device capable of performing the method may ensure randomness of the data in an SLC block and randomness of the data in an MLC block.

That is, a randomizer according to an exemplary embodiment of the present inventive concepts may generate a PN sequence using logical information related to a logical address and physical information related to a physical address, and randomize or de-randomize data using the generated PN sequence, thereby ensuring randomness of the SLC block and randomness of the MLC block and supporting an internal copy back operation.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of operating a data storage device, comprising:
   generating at least one pseudo noise (PN) sequence using logical information and physical information, different than the logical information, for the data storage device; and
   converting first data into second data using the at least one PN sequence,
   wherein generating the at least one PN sequence includes:
      generating a first PN sequence using one of the logical information and the physical information; and
      generating a second PN sequence using the other of the logical information and the physical information, and
   wherein converting the first data into the second data includes:
      converting the first data into intermediate data using the first PN sequence; and
      converting the intermediate data into the second data using the second PN sequence.

2. The method of claim 1,
   wherein the logical information is a logical page address for the data storage device, and the physical information is a physical page address for the data storage device.

3. The method of claim 2,
   wherein generating the at least one PN sequence includes performing an XOR operation on the logical page address and the physical page address.

4. The method of claim 1,
   wherein converting the first data into the second data includes randomizing the first data to obtain randomized second data.

5. The method of claim 1,
   wherein converting the first data into the second data includes de-randomizing the first data to obtain de-randomized second data.

6. The method of claim 1,
   wherein converting the first data into intermediate data comprises randomizing the first data to obtain the intermediate data, and converting the intermediate data into the second data comprises randomizing the intermediate data to obtain the randomized second data.

7. The method of claim 1,
   wherein converting the first data into intermediate data comprises de-randomizing the first data to obtain the intermediate data, and converting the intermediate data into the second data comprises de-randomizing the intermediate data to obtain the second data.

8. A data storage device comprising:
   a memory;
   a PN sequence creator configured to generate at least one pseudo noise (PN) sequence using logical information and physical information, different than the logical information, for the memory;
   a randomizer configured to randomize first data using the at least one PN sequence to obtain randomized second data to be stored in the memory; and
   a de-randomizer configured to de-randomize third data output from the memory using the at least one PN sequence to obtain de-randomized fourth data,
   wherein the PN sequence creator includes:
      a first PN sequence generator configured to generate a first PN sequence using one of the logical information and the physical information; and
      a second PN sequence generator configured to generate a second PN sequence using the other of the logical information and the physical information, and
   wherein the randomizer includes:
      a first converter configured to randomize the first data to obtain randomized first intermediate data using the first PN sequence; and
      a second converter configured to randomize the first intermediate data to obtain the second data using the second PN sequence.

9. The data storage device of claim 8, wherein the PN sequence creator includes:
   a Boolean logic operator configured to perform a Boolean operation on a logical page address related to the logical information and a physical page address related to the physical information.

10. The data storage device of claim 8,
    wherein each of the first PN sequence generator and the second PN sequence generator is one of: a Fibonacci linear feedback PN sequence generator, a Galois linear feedback PN sequence generator, a Fibonacci non-linear feedback PN sequence generator, and a Galois non-linear feedback PN sequence generator.

11. The data storage device of claim 8, wherein the de-randomizer includes:
    a third converter configured to de-randomize the third data to obtain de-randomized second intermediate data using the second PN sequence; and
    a fourth converter configured to de-randomize the second intermediate data to obtain the fourth data using the first PN sequence.

12. A device, comprising:
    a pseudo noise (PN) sequence creator configured to receive a logical address and a physical address, different than the logical address, identifying one or more locations in memory for data to be processed by the device, and further configured to generate at least one PN sequence using both the logical address and the physical address;
    a randomizer configured to randomize the data using the PN sequence when the data is to be stored in the memory; and a de-randomizer configured to de-randomize the data using the PN sequence when the data is to be read from the memory, wherein the PN sequence creator comprises:

a first PN sequence generator configured to receive the logical address and in response thereto to generate a first PN sequence; and a second PN sequence generator configured to receive the physical address and in response thereto to generate a second PN sequence.

13. The device of claim 12, further comprising the memory, wherein when the data is to be stored in the memory, the logical address and the physical address identify one or more locations in the memory where the data randomized by the randomizer is to be stored.

14. The device of claim 12, further comprising the memory, wherein when the data is to be read from the memory, the logical address and the physical address identify one or more locations in the memory where the data to be de-randomized by the de-randomizer is stored.

* * * * *